US012644297B2

(12) United States Patent
Hall et al.

(10) Patent No.: US 12,644,297 B2
(45) Date of Patent: Jun. 2, 2026

(54) DEPLOYABLE MOBILE MODULES

(71) Applicant: MOBILEOP4, L.L.C., Plano, TX (US)

(72) Inventors: Mark A. Hall, Dallas, TX (US); Ric Pearson, League City, TX (US)

(73) Assignee: MOBILEOP4, LLC, Plano, TX (US)

( * ) Notice: Subject to any disclaimer, the term of this patent is extended or adjusted under 35 U.S.C. 154(b) by 75 days.

(21) Appl. No.: 18/594,831

(22) Filed: Mar. 4, 2024

(65) Prior Publication Data

US 2024/0295133 A1      Sep. 5, 2024

Related U.S. Application Data

(60) Provisional application No. 63/449,894, filed on Mar. 3, 2023.

(51) Int. Cl.
E04H 1/12          (2006.01)
B60P 3/34          (2006.01)

(52) U.S. Cl.
CPC ............... E04H 1/125 (2013.01); B60P 3/34 (2013.01)

(58) Field of Classification Search
CPC ....... E04H 1/125; E04H 1/1205; E04H 1/222; E04H 3/08; E04B 1/343; E04B 1/344; E04B 1/34336; E04B 1/34317; E04B 1/34321; E04B 1/34384; E04B 1/3444; E04B 1/3442
See application file for complete search history.

(56) References Cited

U.S. PATENT DOCUMENTS

| | | | | |
|---|---|---|---|---|
| 8,166,715 | B2 * | 5/2012 | De Azambuja .... | B65D 90/0006 52/79.5 |
| 10,648,169 | B2 * | 5/2020 | Lucho Do Valle .......................... | E04B 1/34384 |
| 2009/0217600 | A1 | 9/2009 | De Azambuja | |
| 2012/0255240 | A1 | 10/2012 | Shen | |
| 2012/0279142 | A1 | 11/2012 | Michaud | |
| 2014/0090312 | A1 * | 4/2014 | Medley ................. | E04B 1/3444 52/79.5 |
| 2014/0202088 | A1 | 7/2014 | Nakajima et al. | |
| 2016/0153183 | A1 | 6/2016 | Richter | |
| 2018/0313075 | A1 | 11/2018 | Lucho Do Valle | |

(Continued)

OTHER PUBLICATIONS

International Search Report and Written Opinion issued in PCT application No. PCT/US2024/018385 dated May 28, 2024 (12 pages).

*Primary Examiner* — Beth A Stephan
(74) *Attorney, Agent, or Firm* — Ewing & Jones, PLLC

(57)          ABSTRACT
A deployable mobile module configurable to be deployed to remote sites. The deployable mobile module includes an outer housing, a roof panel, the roof panel pivotably coupled to a lower edge of the outer housing; a floor panel, the floor panel pivotably coupled to an upper edge of the outer housing; and two sidewall assemblies, the sidewall assemblies pivotably coupled to a side edge of the outer housing, the sidewall assemblies each including a sidewall housing and a front wall subassembly that includes a door, the front wall subassembly pivotably coupled to a front edge of the sidewall housing. By unfolding the floor panel, roof panel, sidewall housings, and front wall subassemblies, a structure may be deployed. The deployable mobile module may have one or more pieces of equipment and other systems installed thereto such that the structure is ready to operate with minimal additional setup time.

28 Claims, 20 Drawing Sheets

(56)     References Cited

U.S. PATENT DOCUMENTS

2021/0348407 A1* 11/2021 Bruns ..................... E04H 1/005
2021/0395994 A1   12/2021 Kolisnek
2022/0356698 A1* 11/2022 Bruns ................ E04B 1/34861
2023/0304278 A1*  9/2023 DiCristofaro ............. E04H 3/08

* cited by examiner

*F*IG. 1

*F*IG. 2

100

101

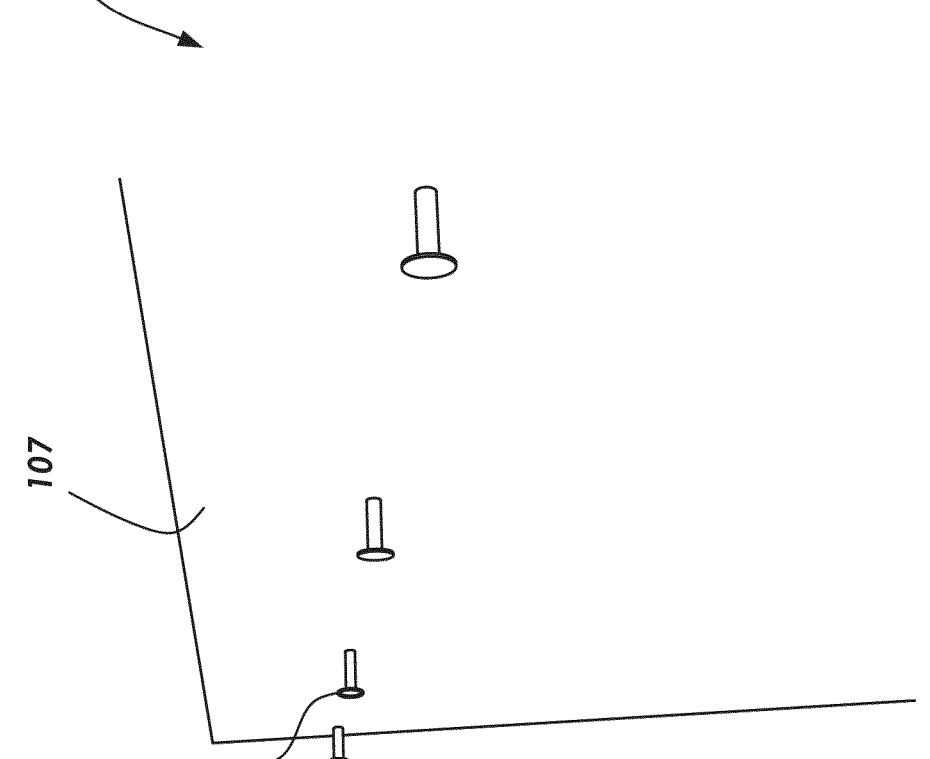
*F*IG. 3C

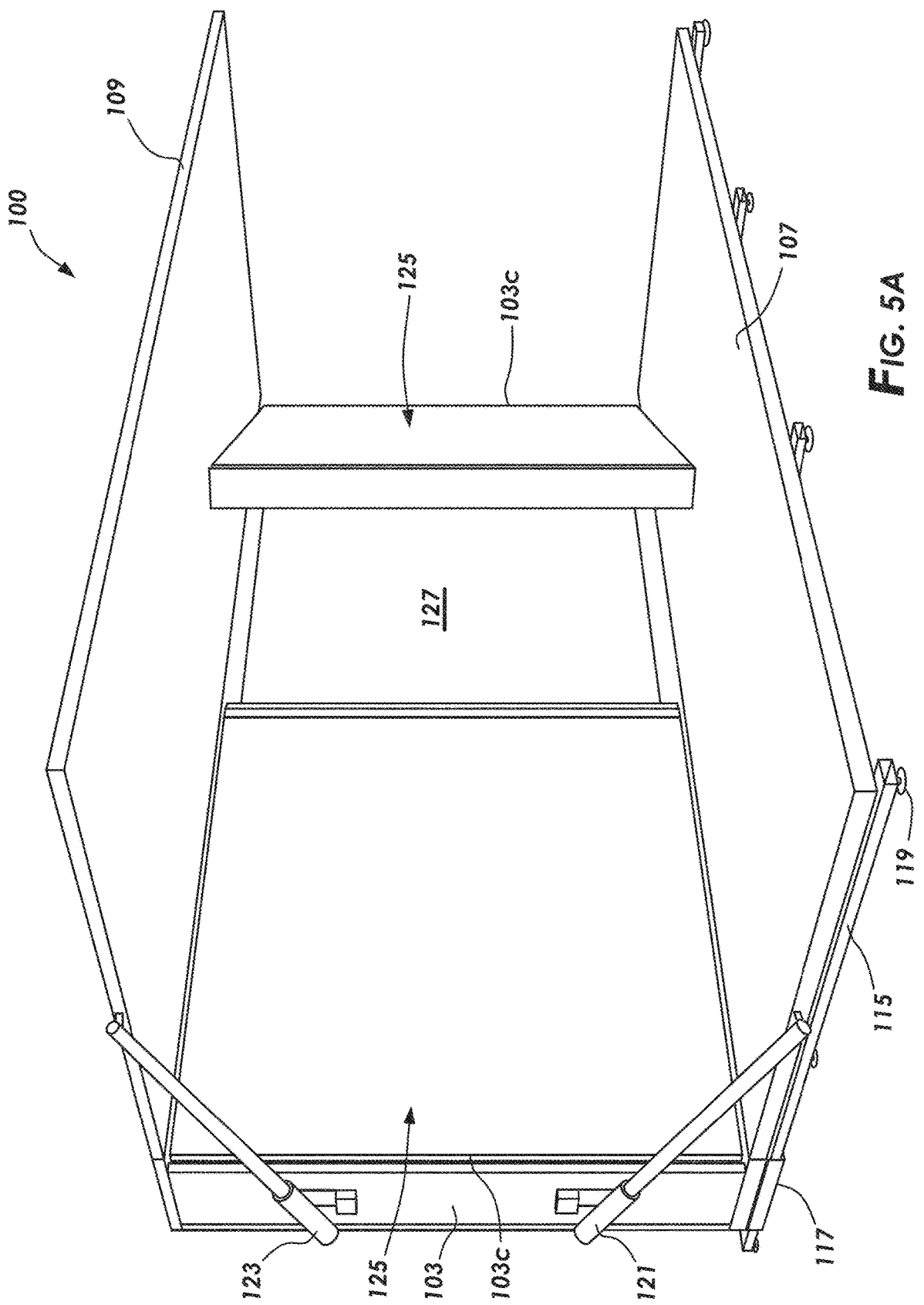
*F*IG. 5A

DEPLOYABLE MOBILE MODULES

CROSS-REFERENCE TO RELATED APPLICATIONS

This application is a nonprovisional application which claims priority from U.S. provisional application No. 63/449,894, filed Mar. 3, 2023, which is incorporated by reference herein in its entirety.

TECHNICAL FIELD/FIELD OF THE DISCLOSURE

The present disclosure relates generally to mobile structures, and specifically to mobile deployable modular structures.

BACKGROUND OF THE DISCLOSURE

While operating in remote regions or during emergency scenarios, specialized facilities such as for medical or housing, may be required. When sufficiently remote, access to dedicated facilities may be impossible. Additionally, any facilities that do exist may be overwhelmed, necessitating temporary or otherwise non-dedicated facilities to be used to supplement their capacity. The outfitting of such temporary facilities is difficult, as it requires the necessary equipment to be located and sent to the facility to be used, which may delay the ability of responding personnel to meet the requirements of the situation.

SUMMARY

The present disclosure provides for a method. The method may include transporting a deployable mobile module to a location. The deployable mobile module may include an outer housing. The deployable mobile module may include a roof panel, the roof panel pivotably coupled to a lower edge of the outer housing. The deployable mobile module may include a floor panel, the floor panel pivotably coupled to an upper edge of the outer housing. The deployable mobile module may include a first sidewall assembly, the first sidewall assembly pivotably coupled to a first side edge of the outer housing, the first sidewall assembly including a first sidewall housing and a first front wall subassembly, the first front wall subassembly pivotably coupled to a front edge of the first sidewall housing. The deployable mobile module may include a second sidewall assembly, the second sidewall assembly pivotably coupled to a second side edge of the outer housing, the second sidewall assembly including a second sidewall housing and a second front wall subassembly, the second front wall subassembly pivotably coupled to a front edge of the second sidewall housing. The method may include unfolding the roof panel by pivoting the roof panel upward relative to the outer housing to a substantially horizontal position. The method may include unfolding the floor panel by pivoting the floor panel downward relative to the outer housing to a substantially horizontal position. The method may include unfolding the first sidewall assembly to a position substantially perpendicular to the outer housing. The method may include unfolding the second sidewall assembly to a position substantially perpendicular to the outer housing. The method may include unfolding the first front wall subassembly to a position substantially perpendicular to the first sidewall housing. The method may include unfolding the second front wall subassembly to a position substantially perpendicular to the second sidewall housing and abutting the first front wall subassembly such that the outer housing, roof panel, floor panel, first sidewall housing, first front wall subassembly, second sidewall housing, and second front wall subassembly form an enclosed space.

The present disclosure also provides for a deployable mobile module. The deployable mobile module may include an outer housing. The deployable mobile module may include a roof panel, the roof panel pivotably coupled to a lower edge of the outer housing. The deployable mobile module may include a floor panel, the floor panel pivotably coupled to an upper edge of the outer housing. The deployable mobile module may include a sidewall assembly, the sidewall assembly pivotably coupled to a side edge of the outer housing, the sidewall assembly including a sidewall housing and a front wall subassembly, the front wall subassembly pivotably coupled to a front edge of the sidewall housing.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 3C depicts a detail perspective view of deployable mobile module of FIG. 3.

DETAILED DESCRIPTION

Figure 1:
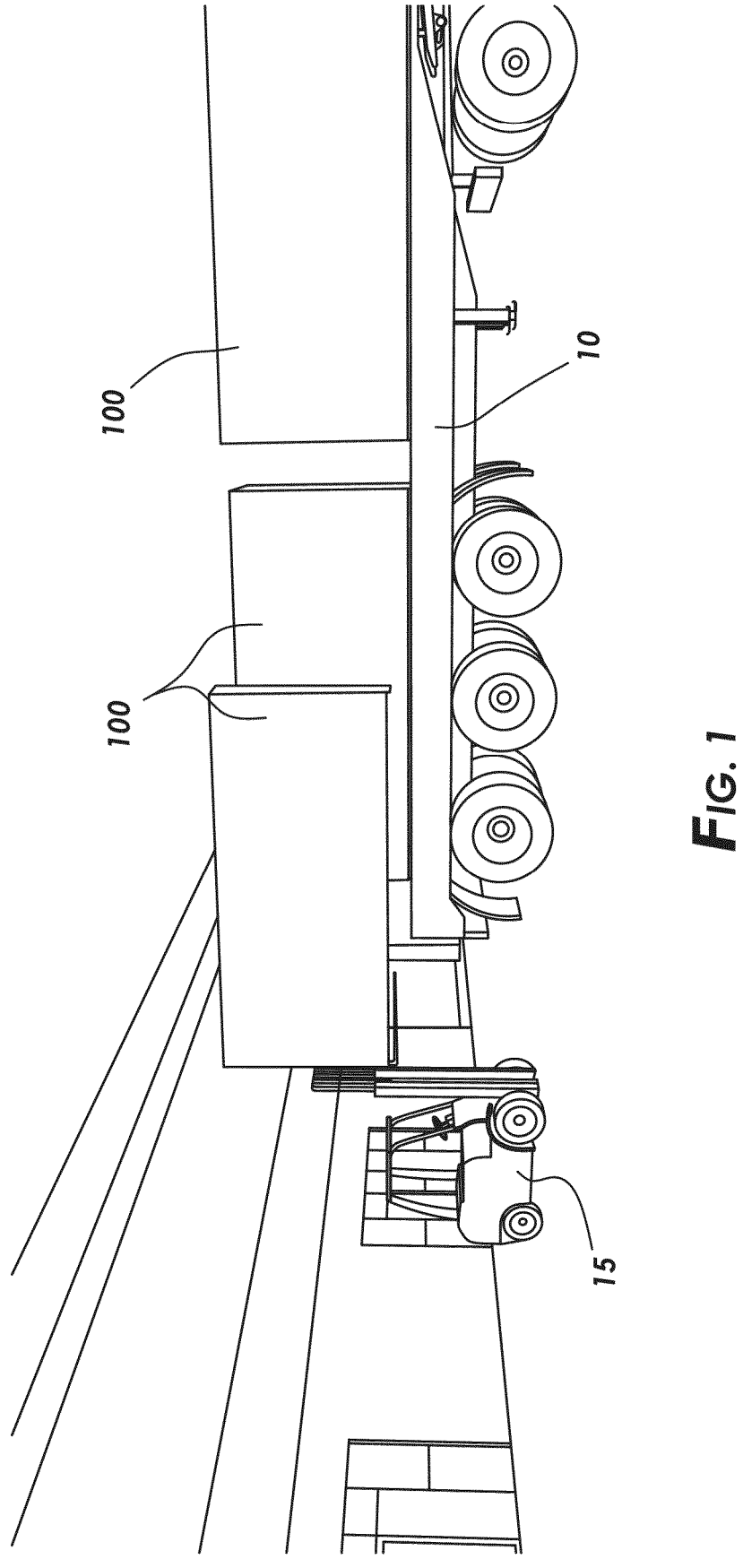
FIG. 1 depicts deployable mobile modules consistent with at least one embodiment of the present disclosure in transport configuration positioned on the back of a truck for transport.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
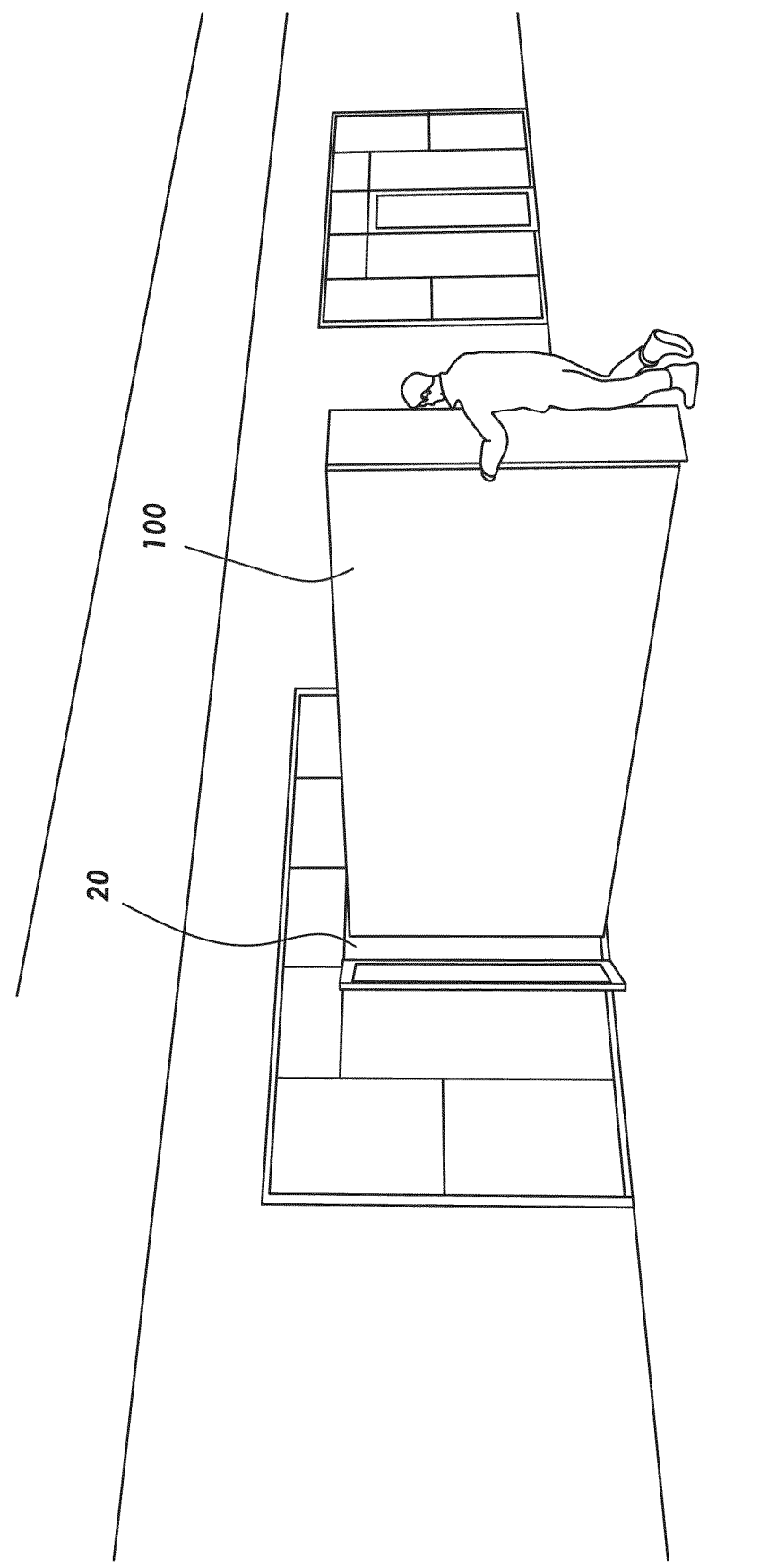
FIG. 2 depicts a deployable mobile module consistent with at least one embodiment of the present disclosure in the transport configuration being repositioned into a building.

FIG. 1 depicts multiple deployable mobile modules 100 positioned on truck 10 that are configured in a transport configuration. In the transport configuration, each deployable mobile module 100 may fold into a compact shape to enable transportation by, for example and without limitation, one or more of truck 10, forklift 15, dolly, manpower (as shown in FIG. 2), or helicopter. In some embodiments, for example and without limitation, the transport configuration may have external dimensions of approximately 2'5½"×7'10"×15'4". In the deployed configuration, as discussed further below, deployable mobile module 100 may expand to a structure of approximately 9'4"×7'10"×15'4". As shown in FIG. 2, when in the transport configuration, deployable mobile module 100 may be transportable through a standard doorway 20 without modification to doorway 20 or any further disassembly of deployable mobile module 100.

Figure 3:
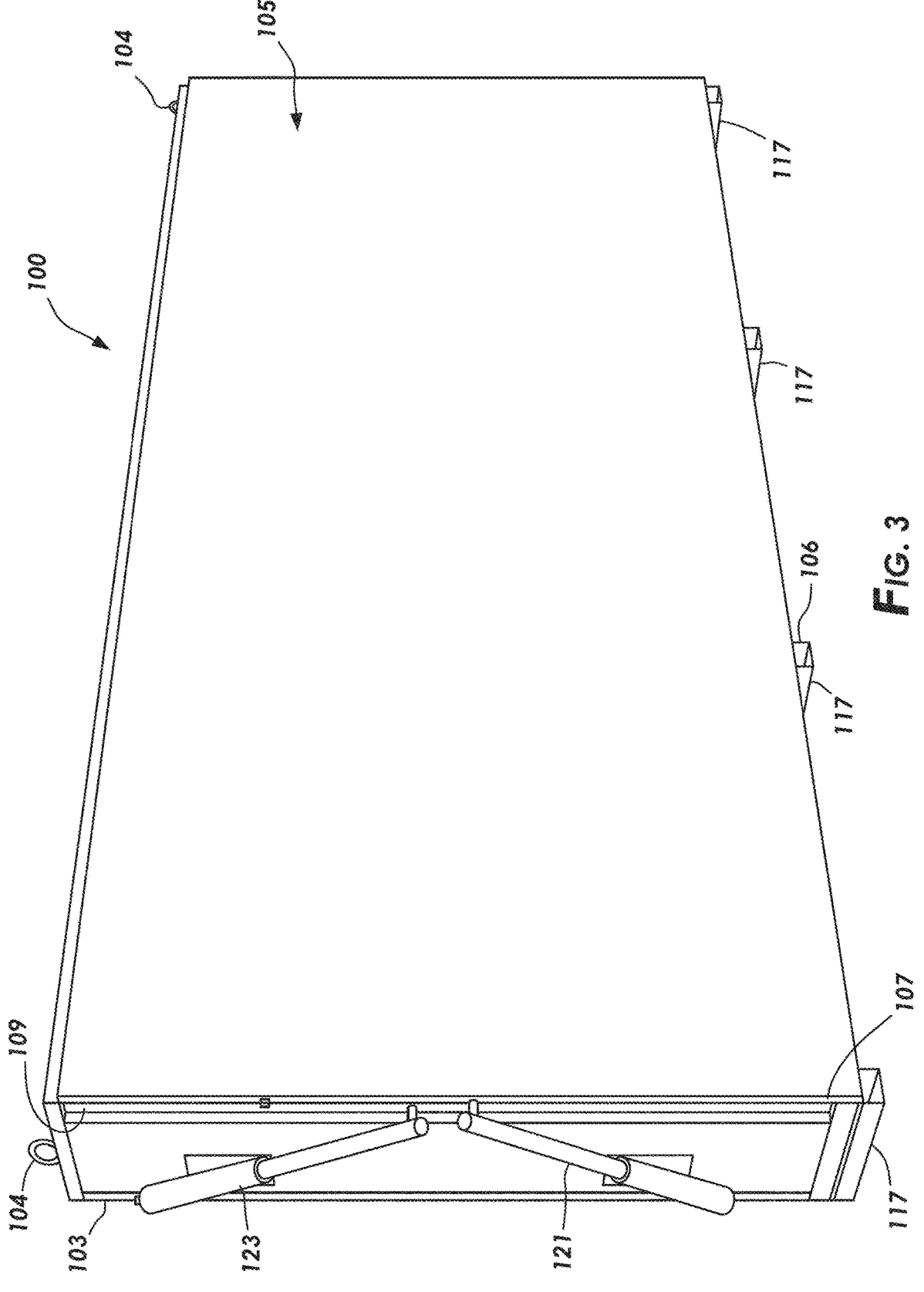
FIG. 3 depicts a deployable mobile module consistent with at least one embodiment of the present disclosure in the transport configuration before deployment.
Figure 3A:
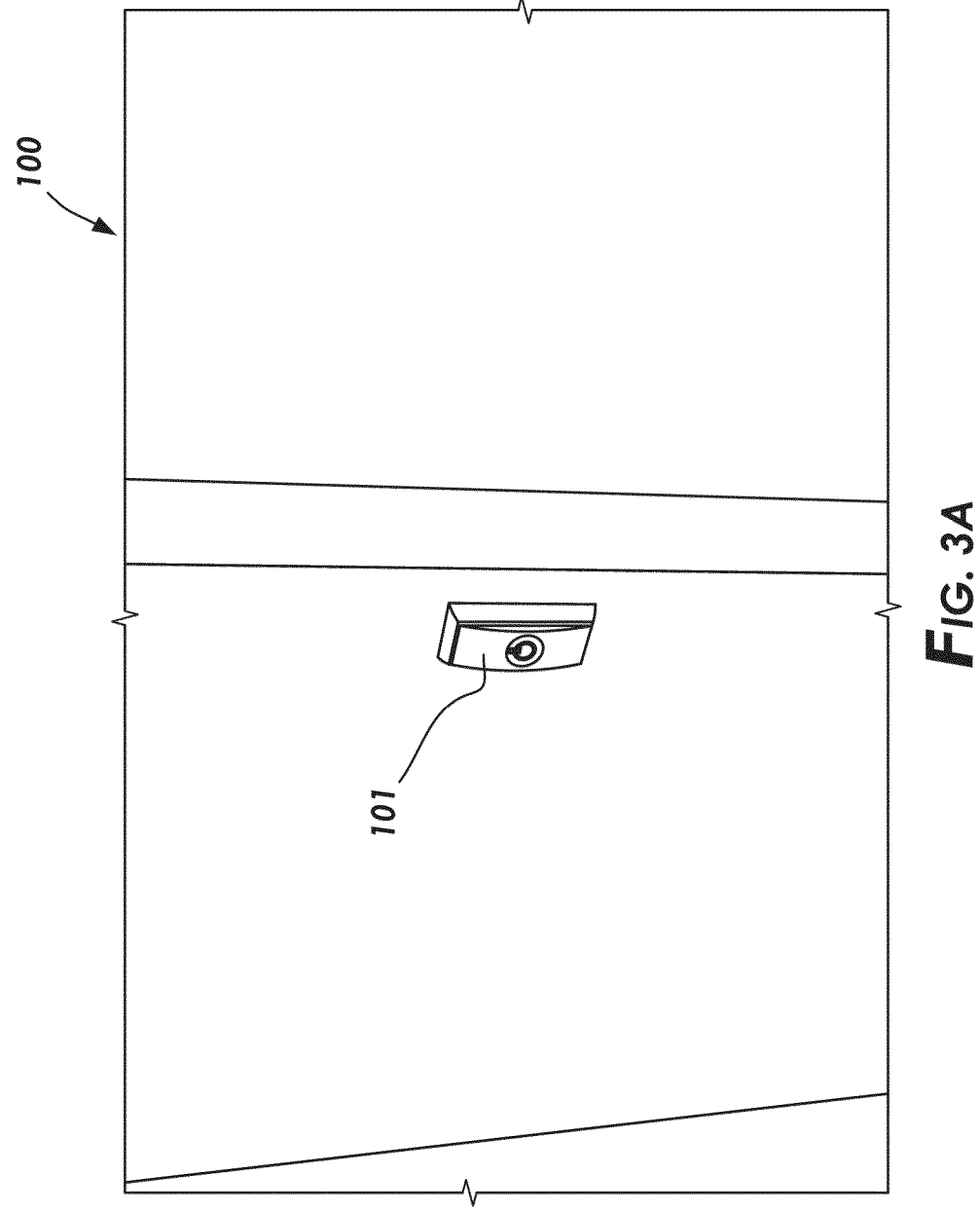
FIG. 3A depicts a detail side view of deployable mobile module of FIG. 3.

Deployable mobile module 100 may be relocated to a desired deployment location, as shown in FIG. 3. The deployment location may be outside or within an existing structure. In some embodiments, deployable mobile module 100 may be deployed directly from a trailer, to a wall-mounted location, or in a freestanding location. In some embodiments, deployable mobile module 100 may be securable to a wall by, for example and without limitation, one or more fasteners or other hardware. In some embodiments, deployable mobile module 100 may include one or more locks 101 as shown in FIG. 3A configured to keep deployable mobile module 100 in the transport position until deployment is desired. Locks 101 may secure the components of deployable mobile module 100 in the transport position and may, for example and without limitation, protect deployable mobile module 100 and its contents from tampering or theft. In some embodiments, when in the transport configuration, the entirety of deployable mobile module 100 may be contained within outer housing 103 and front panel 105. In some embodiments, outer housing 103 may include one or more features to facilitate transportation of deployable mobile module 100 including, for example and without limitation, one or more lifting handles, crane hooks, attachment points for cables to secure the top of outer housing 103 at any such crane hook locations 104, and forklift lifting points 106. In some embodiments, dolly wheel caddies may be coupleable to reinforced locations of outer housing 103 which may be usable to transport deployable mobile module 100. In such an embodiment, one or more jacking points may be positioned to allow deployable mobile module 100 to be lifted for the installation of the dolly wheel caddies. In some embodiments, outer housing 103 may include one or more tie down points to assist with transportation of deployable mobile module 100.

As further discussed below, in some embodiments, front panel 105 may form or be formed by floor panel 107 or roof panel 109. As discussed further below, front panel 105 may be opened to deploy deployable mobile module 100. Locks 101 may therefore retain front panel 105 to outer housing 103 in a folded position, preventing opening of deployable mobile module 100.

Figure 3B:
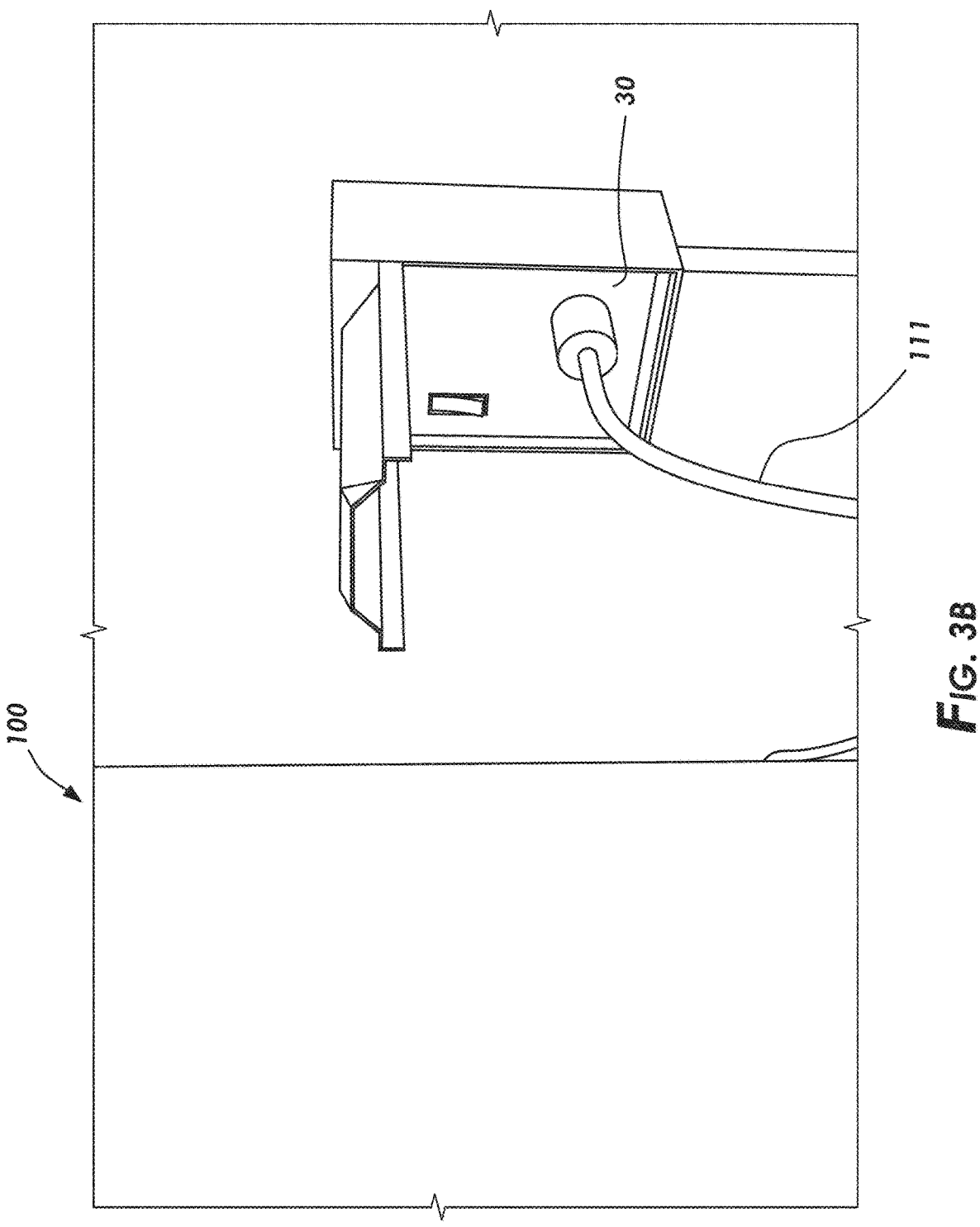
FIG. 3B depicts a detail perspective view of deployable mobile module of FIG. 3.

In some embodiments, as shown in FIG. 3B, deployable mobile module 100 may include power connection 111.

Power connection 111 may, in some embodiments, be a single power cable configured to connect deployable mobile module 100 and electrical systems thereof to an external source of power such as mains power connection 30. In such an embodiment, deployable mobile module 100 may be powered using a standard extension cord. In other embodiments, power connection 111 may connect to other sources of power including, for example and without limitation, a generator, solar panel, or other power generation or storage system. In some embodiments, each end of deployable mobile module 100 may include a respective power connection 111 which may, for example and without limitation, provide redundant connections, allow more flexibility with connecting to external power, or may separately power a respective side of deployable mobile module 100. In some embodiments, one or each end of deployable mobile module 100 may include additional connections for, for example and without limitation, one or more of network connections, water connections, oxygen connections, gas connections, and wastewater connections.

As shown in FIG. 3C, in some embodiments, floor panel 107 of deployable mobile module 100 may include one or more floor risers 113. Floor risers 113 may be operatively coupled to floor panel 107 to allow support for the floor panel when in the deployed configuration. Specifically, with reference to FIG. 4, floor risers 113 may contact the ground. In some embodiments, floor risers 113 may be adjustable to account for any variations in the terrain of the ground and to level floor panel 107. For example, in some embodiments, floor risers 113 may be threadedly coupled to floor panel 107 such that rotation of each floor riser 113 changes the overall length of the floor riser 113 such that floor panel 107 is level and evenly supported on the ground surface.

Figure 4:
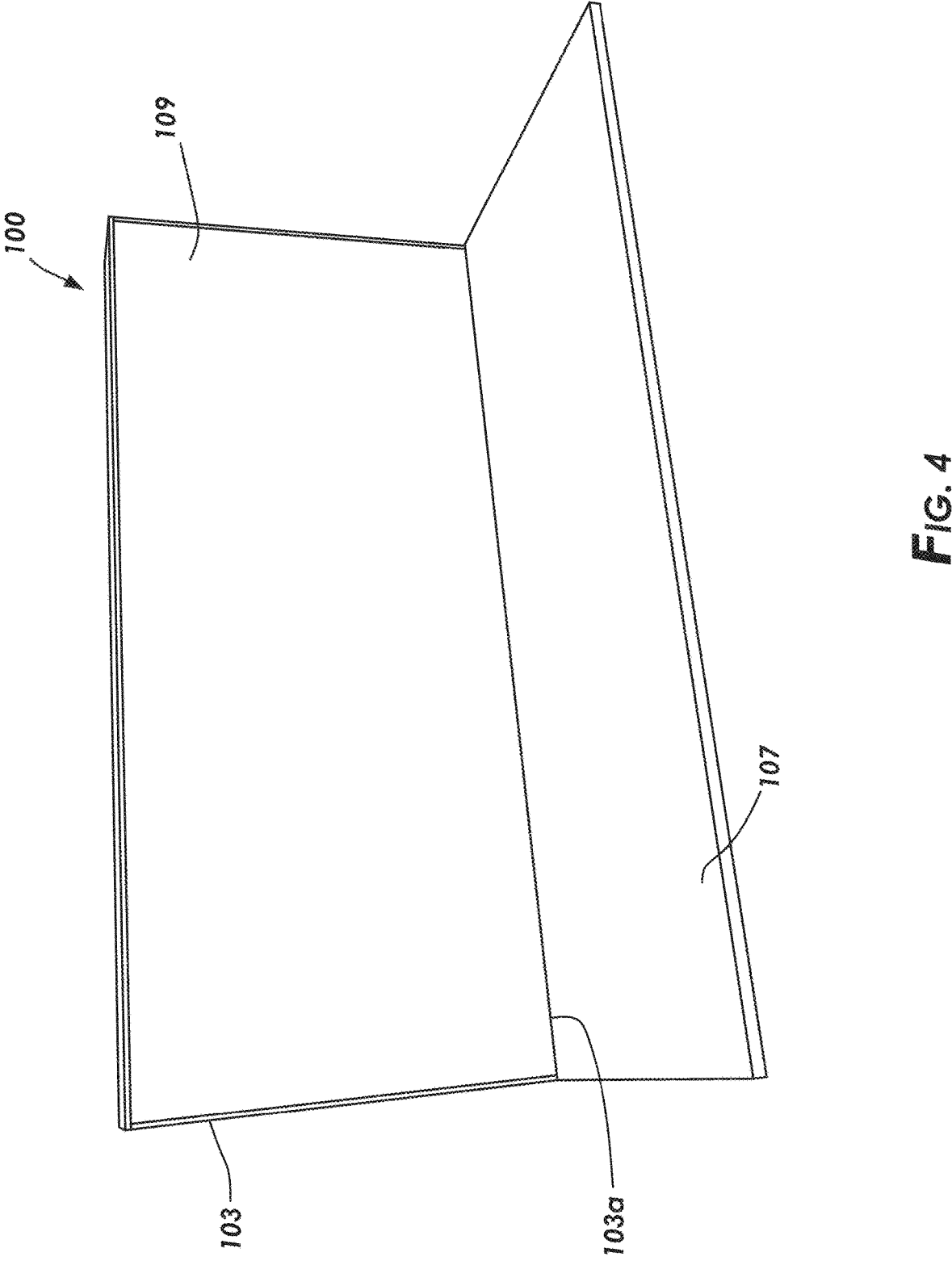
FIGS. 4-8 depict a deployment operation of deployable mobile module of FIG. 3.
Figure 4A:
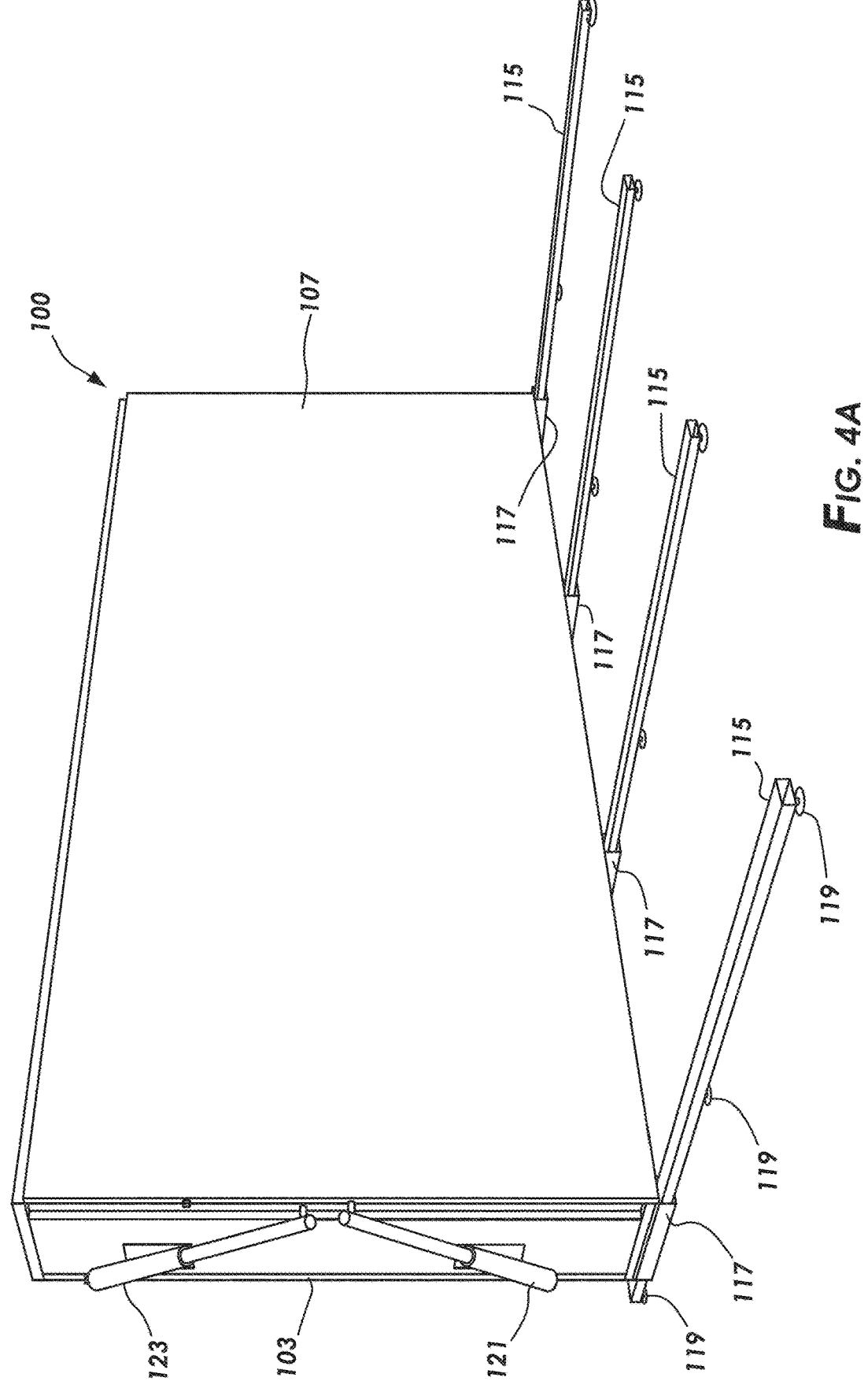

In other embodiments, as shown in FIG. 4A, deployable mobile module 100 may include one or more floor spreaders 115 attachable to outer housing 103 of deployable mobile module 100. Floor spreaders 115 may couple to outer housing 103 at corresponding receptacles 117 coupled to outer housing 103. In some embodiments, floor spreaders 115 may each include one or more spreader floor risers 119 coupled thereto. Spreader floor risers 119 may contact the ground surface once installed. In some embodiments, spreader floor risers 119 may be adjustable to account for any variations in the terrain of the ground and to level floor spreaders 115. For example, in some embodiments, spreader floor risers 119 may be threadedly coupled to floor spreaders 115 such that rotation of each spreader floor riser 119 changes the overall length of the spreader floor riser 119 such that the corresponding floor spreader 115 is level and evenly supported on the ground surface. In some embodiments, each floor spreader 115 may include a spirit level positioned to confirm the levelness of the floor spreader 115. As further described below, floor spreaders 115 may form a platform for floor panel 107 of deployable mobile module 100 and may further spread out the footprint of deployable mobile module 100, thus providing further stability to deployable mobile module 100 during, for example and without limitation, deployment operations and while deployed.

In some embodiments, deployable mobile module 100 may include floor actuator 121 coupled between outer housing 103 and floor panel 107 as shown in FIG. 3. In some embodiments, deployable mobile module 100 may include roof actuator 123 coupled between outer housing 103 and roof panel 109. Floor actuator 121 and roof actuator 123 may, in some embodiments, be an electric linear actuator or may be hydraulically or pneumatically powered.

Figure 5:
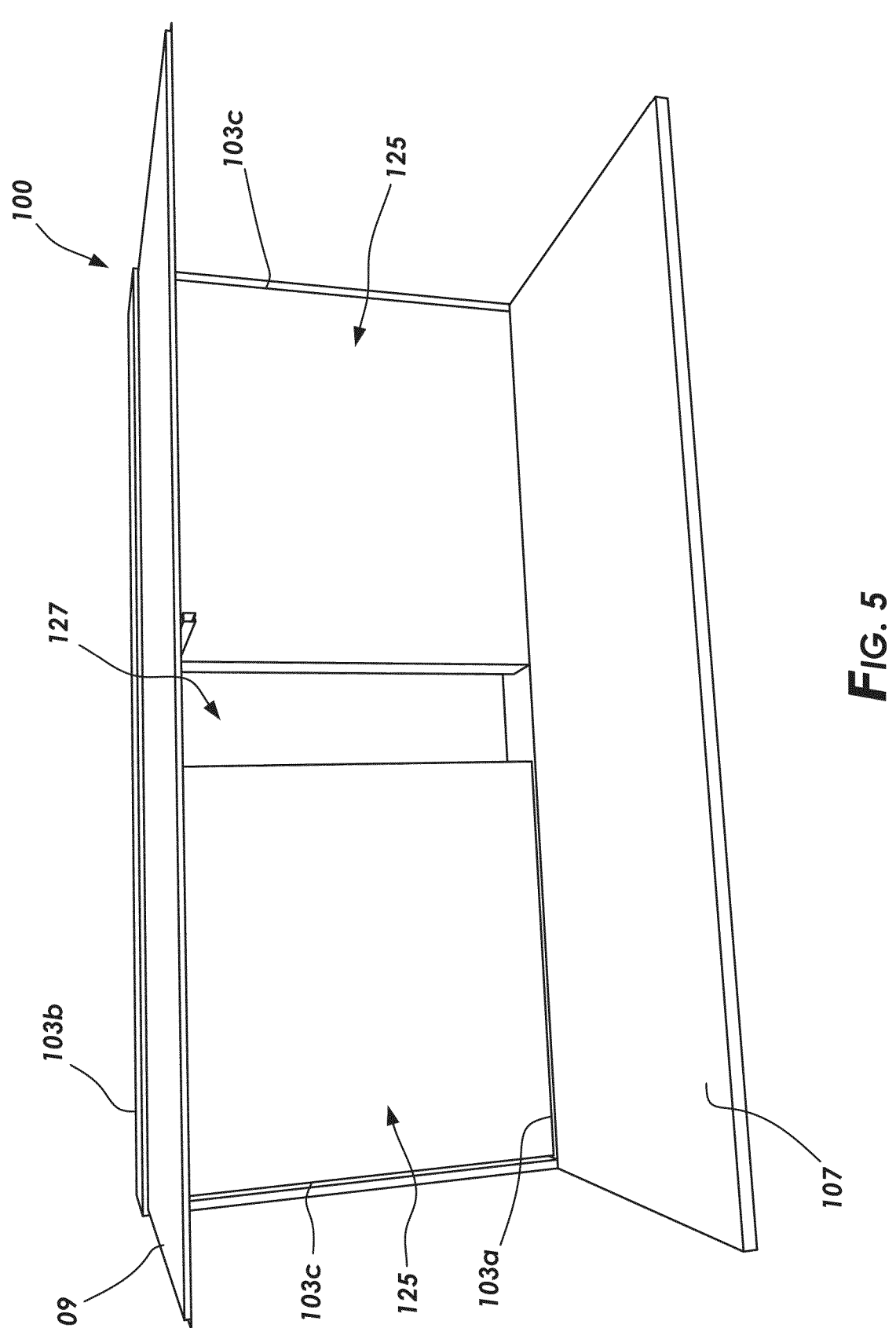

Once positioned at the desired deployment location, deployable mobile module 100 may be deployed. In some embodiments, deployable mobile module 100 may be configured to be deployed by a single person in a short period of time. In order to deploy deployable mobile module 100, in some embodiments, floor panel 107 may be first folded down to a substantially horizontal position as shown in FIG. 4. Floor panel 107 may be pivotably coupled to lower edge 103*a* of outer housing 103 and may form the floor of deployable mobile module 100 when in the unfolded configuration. In some embodiments, floor panel 107 may be coupled to outer housing 103 by a hinge such as a piano hinge with an integrated waterproof gasket. In embodiments that include locks 101, locks 101 may be released before floor panel 107 is folded down. In such an embodiment, once floor panel 107 is folded down, roof panel 109 may be folded up to a substantially horizontal position as shown in FIG. 5.

Figure 4B:
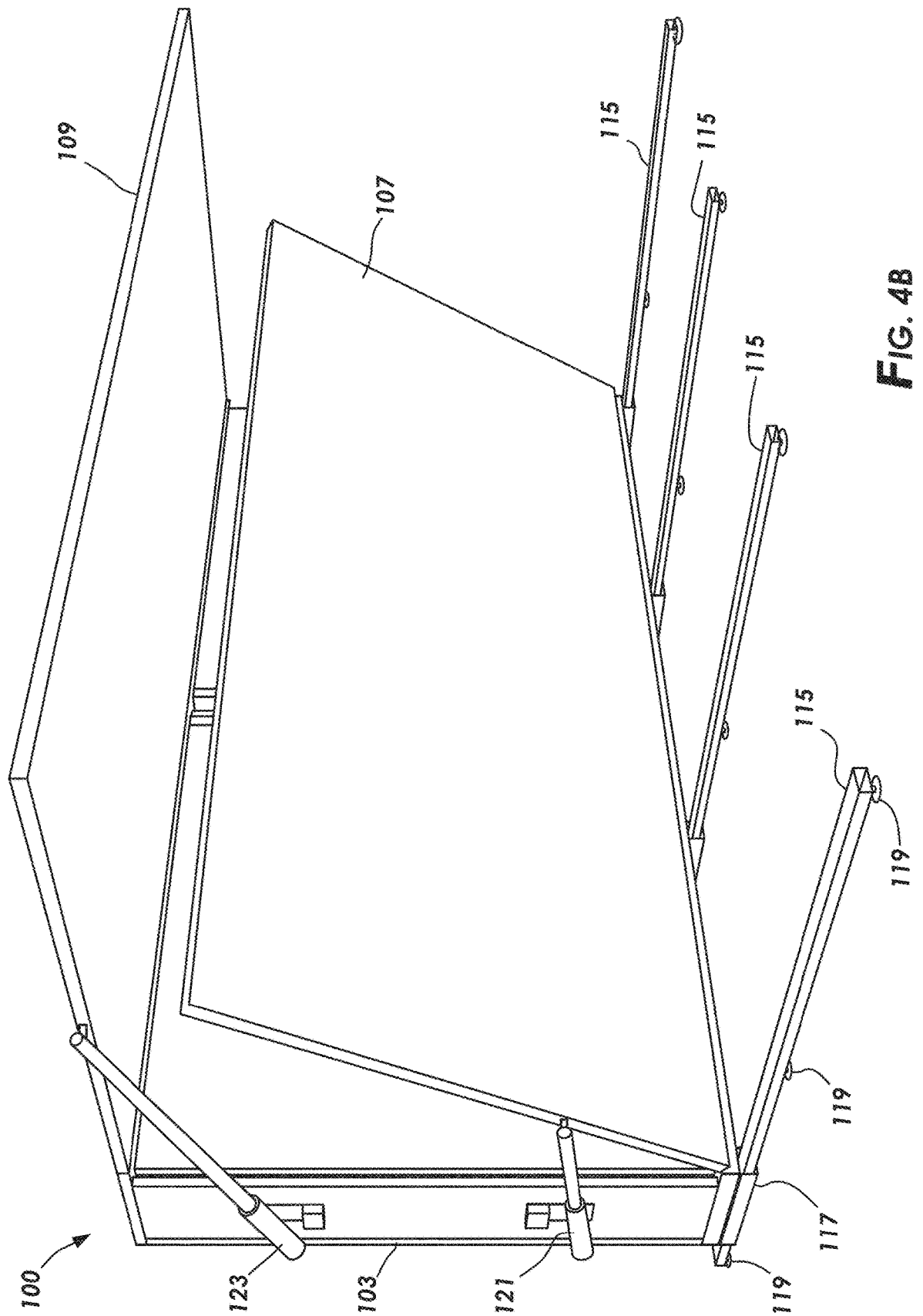

In other embodiments, as shown in FIG. 4B, roof panel 109 may be unfolded to a substantially horizontal position first. Roof panel 109 may be pivotably coupled to upper edge 103*b* of outer housing 103. In some embodiments, roof panel 109 may be coupled to outer housing 103 by a hinge such as a piano hinge with an integrated waterproof gasket. Roof panel 109 may form the roof of deployable mobile module 100 when in the deployed configuration. In embodiments that include locks 101, locks 101 may be released before roof panel 109 is folded up. In such an embodiment, once roof panel 109 is folded up, floor panel 107 may be folded down to a substantially horizontal position as shown in FIG. 5.

In embodiments that include floor actuator 121 or roof actuator 123, floor actuator 121 or roof actuator 123 may be used to assist with the unfolding of floor panel 107 or roof panel 109, respectively. Additionally, roof actuator 123 may be used to maintain roof panel 109 in the unfolded configuration and support the weight thereof as the deployment operation of deployable mobile module 100 continues.

In other embodiments, floor panel 107 or roof panel 109 may be unfolded manually.

Figure 6:
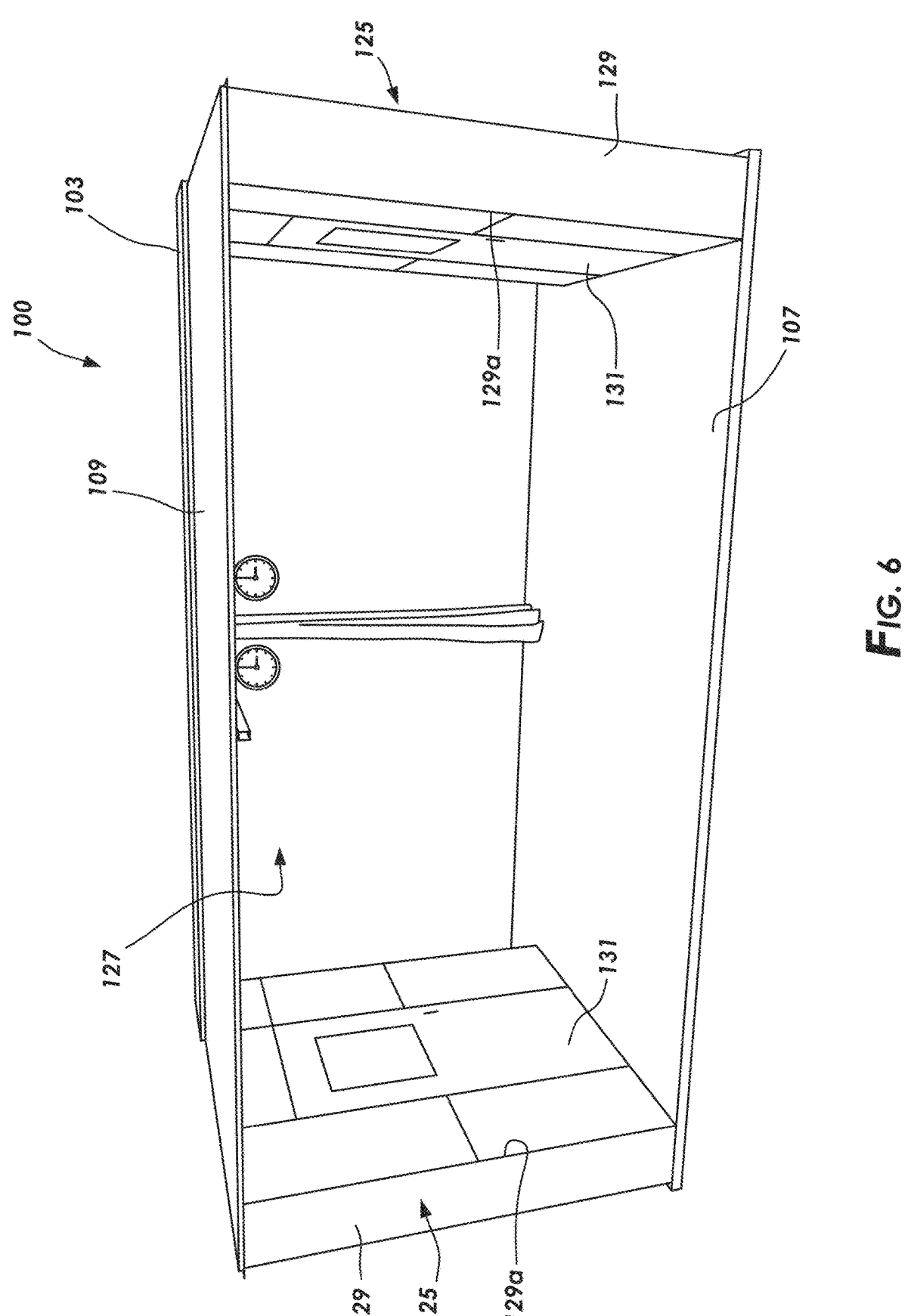

Sidewall assemblies 125 may then be deployed. Sidewall assemblies 125 may be pivotably coupled to side edges 103*c* of outer housing 103. In some embodiments, each sidewall assembly 125 may be coupled to outer housing 103 by a hinge such as a piano hinge with an integrated waterproof gasket. Sidewall assemblies 125 may be deployed, as shown in FIG. 5A, by folding each sidewall assembly 125 out from back wall 127 of outer housing 103 into a deployed position substantially perpendicular to outer housing 103 as shown in FIG. 6. In some embodiments, sidewall assemblies 125 may extend between floor panel 107 and roof panel 109 when deployed and, in some embodiments, may support roof panel 109 once sidewall assemblies 125 are deployed.

Figure 6A:
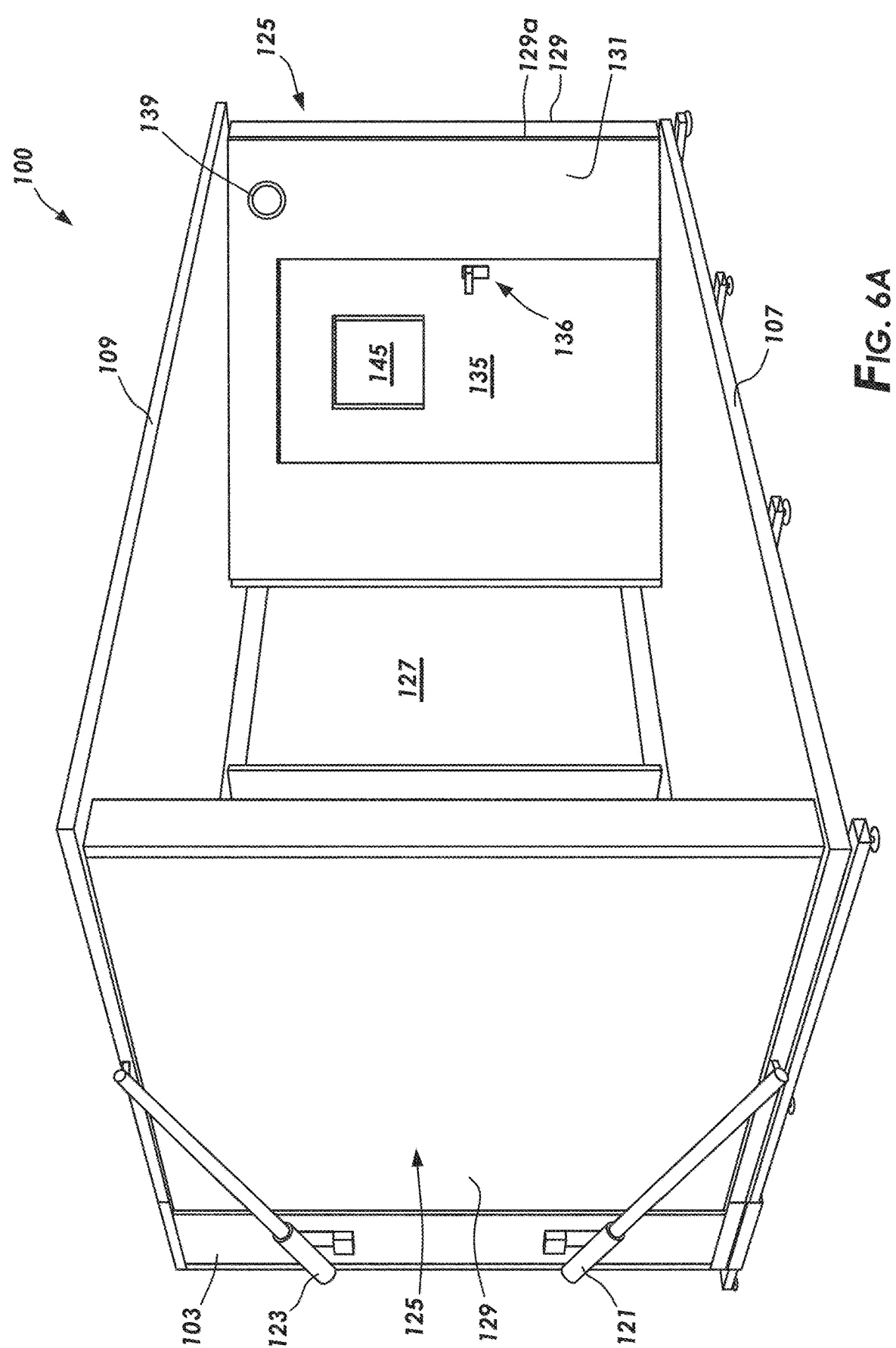
Figure 7:
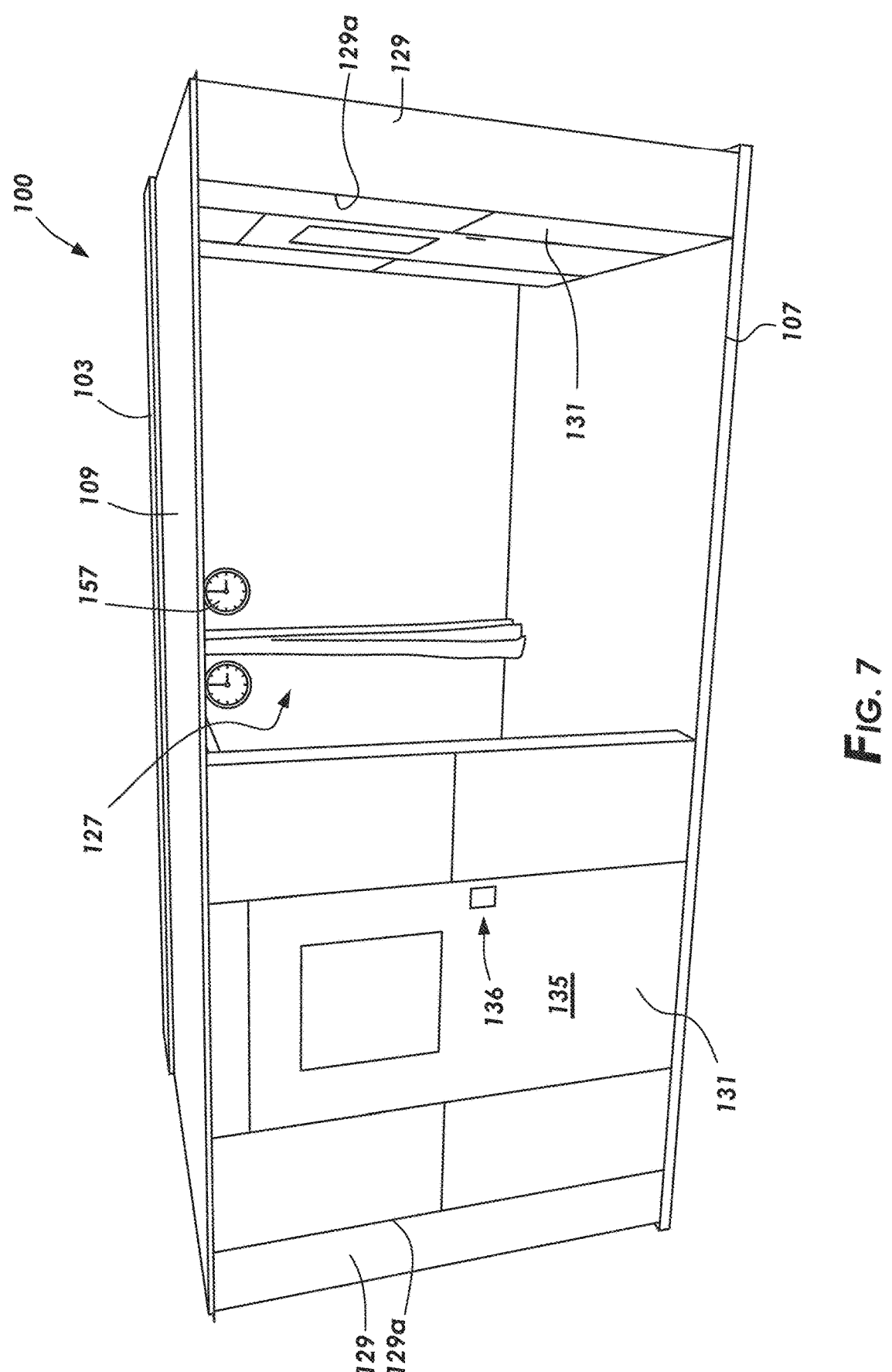
Figure 8:
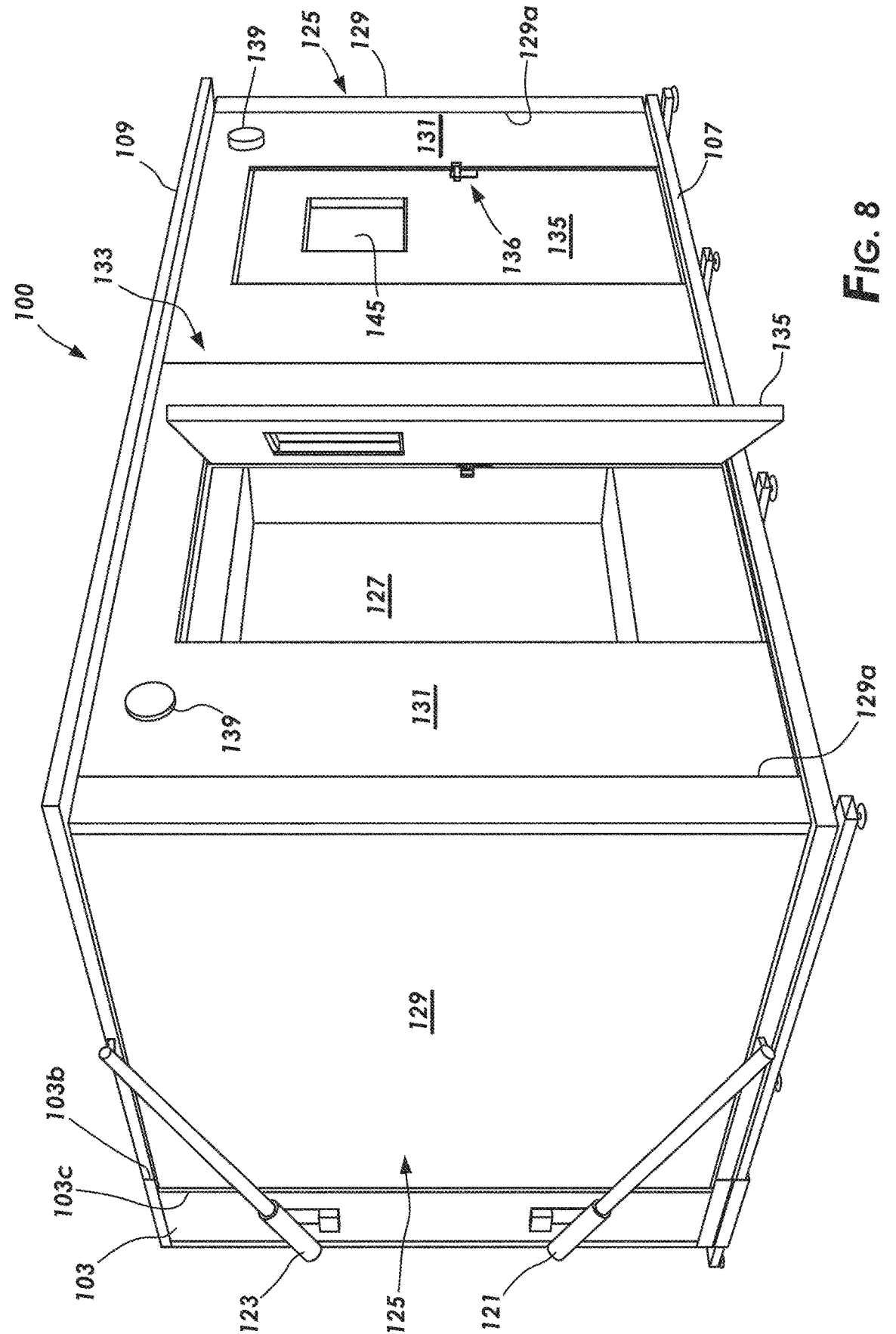
Figure 9:
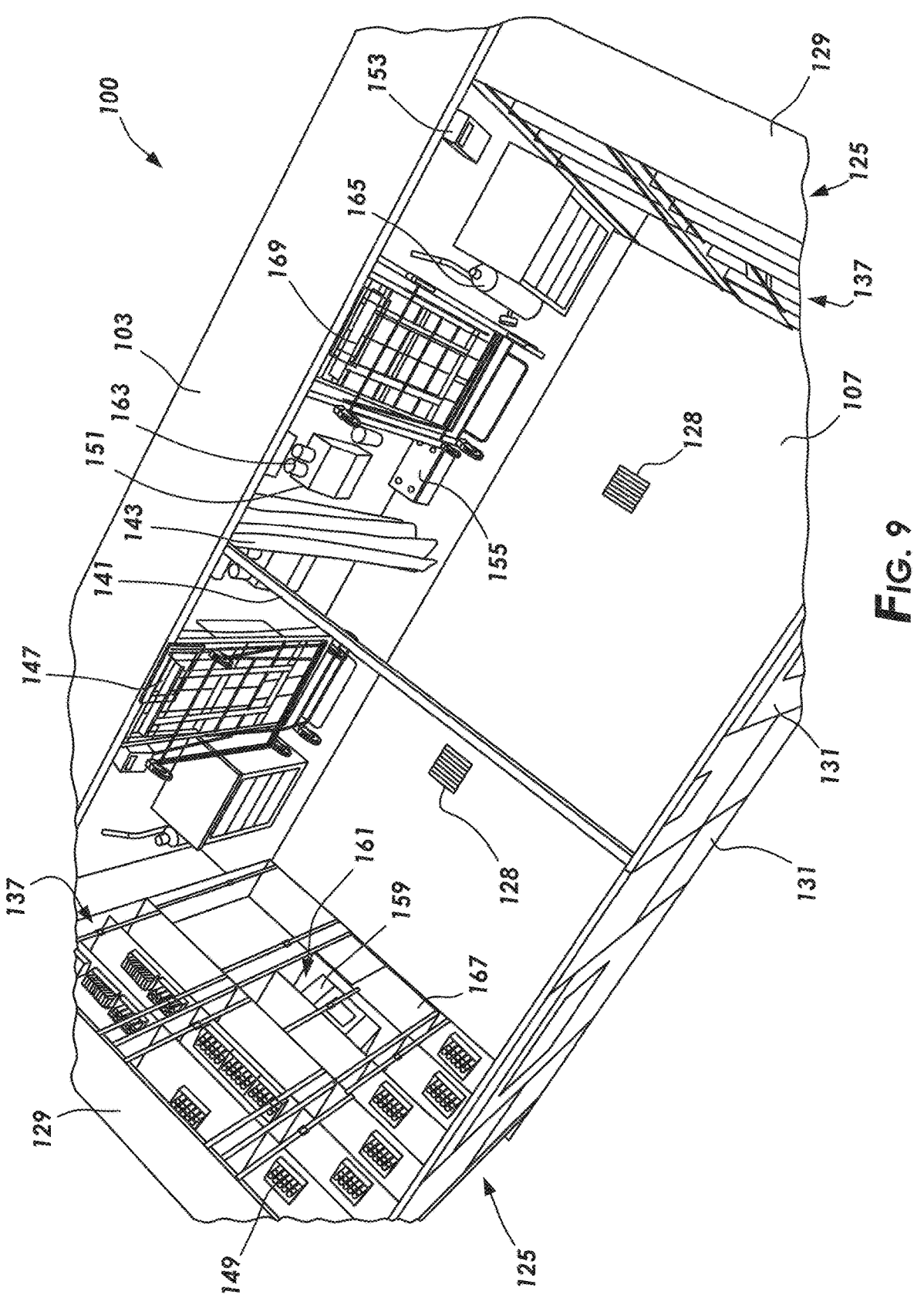
FIGS. 9 and 10 depict partially transparent perspective views of a deployable mobile module in a deployed configuration consistent with at least one embodiment of the present disclosure.

In some embodiments, each sidewall assembly 125 may include sidewall housing 129 and front wall subassembly 131. Each front wall subassembly 131 may be pivotably coupled to front edge 129*a* of a respective sidewall housing 129. In some embodiments, each front wall subassembly 131 may be coupled to a respective sidewall housing 129 by a hinge such as a piano hinge with an integrated waterproof gasket. Once the sidewall assemblies 125 are extended, front wall subassemblies 131 may be folded out to a position substantially parallel to outer housing 103 as shown in FIG. 6A from sidewall housings 129. Once fully unfolded, front wall subassemblies 131 may collectively form the front wall 133 of deployable mobile module 100 as shown in FIG. 7, which shows one front wall subassembly in the deployed configuration. Once fully deployed, as shown in FIG. 9, deployable mobile module 100 may form a substantially weatherproof workspace as further described below as defined by floor panel 107, roof panel 109, sidewall housings 129, front wall 133 formed by front wall subassemblies 131, and back wall 127 formed by outer housing 103. In some embodiments, each component may be secured in the deployed position by coupling to one or more adjacent components. In such embodiments, such couplings may take the form of one or more fasteners or one or more clamps such as L clamps, spring-loaded snap locks, tension snaps, cam locks, or magnetic clip locks. In some such embodiments, clamps and other fasteners may be installed to one component and may be adapted to engage or otherwise couple to recesses formed in the other corresponding component to be coupled.

In some embodiments, front wall subassemblies 131 may include doors 135 which, as shown in FIG. 9, may be pivotably coupled to the rest of the respective front wall subassembly 131, allowing for access to the interior of deployable mobile module 100. In some embodiments, doors 135 may include door hardware 136 including, for example and without limitation, one or more of latches or locks positioned to secure doors 135 in the closed position and, where a lock is fitted, lock against unwanted entry. In some embodiments, door hardware 136 may include a keypad-secured keyed entry system.

In some embodiments, one or more of the above-described components of deployable mobile module 100 may contain features associated with the intended use of deployable mobile module 100. For example, storage systems such as shelves 137 may be positioned in sidewall assemblies 125 as shown in FIG. 9. Additionally, equipment may be coupled to back wall 127. Likewise, in some embodiments, lighting may be connected to the inside of roof panel 109. External lighting 139 may also be integrated into deployable mobile module 100 such as shown in FIG. 9.

In some embodiments, roof panel may include partition rail 141 as shown in FIG. 9 to allow partition 143 to section the interior of deployable mobile module 100 into two separate rooms. By incorporating these components into the design, once deployable mobile module 100 is deployed, any such equipment is ready for use and in position without having to either transport such components separately, move components from one location to another, or install such components to deployable mobile module 100 during deployment. Deployable mobile module 100, while in the transport configuration, may thus transport elements necessary for the use of the temporary facility along with the temporary facility in which they will be used.

In some embodiments, deployable mobile module 100 may be preconfigured for its intended use, such that a specific deployable mobile module 100 can be supplied to the needed area with all required equipment already installed and ready to be used once deployable mobile module 100 is deployed. In some embodiments, for example and without limitation, deployable mobile module 100 may be one or more of a surgical/triage unit, clinic, field veterinary unit, isolation unit, imaging facility, laboratory, command and control center, portable pharmacy, field engineering office, holding cell, concession stand, vendor kiosk, or dormitory.

Deployable mobile module 100 may be configured for indoor or outdoor deployment. Deployable mobile module 100 may be configured as a wall mount unit, trailer mounted, or ground mounted. In some embodiments, doors may be approximately 42"×78" and may include observation glazing 145. Deployable mobile module 100 may include hookups for portable water and wastewater, medical gases, and power. In some embodiments, deployable mobile module 100 may be supplied with hardwired, intermodal RF, or satellite data transfer systems to provide onboard communications such as intranet and internet connections. Deployable mobile module 100 may be field-serviceable by commercial, off the shelf tools and supplies. In some embodiments, deployable mobile module 100 may include HVAC systems such as heating and cooling systems and may include HEPA filtration for both positive and negative air pressures.

In some embodiments, components of deployable mobile module 100 may be formed at least partially from foam composite materials. For example and without limitation, one or more of outer housing 103, floor panel 107, roof panel 109, sidewall housings 129, front wall subassemblies 131, and back wall 127 may be formed from layered composites of foam and polymers such as fiber reinforced polymer sheets to form the outer surfaces thereof. In some embodiments, one or more of outer housing 103, floor panel 107, roof panel 109, sidewall housings 129, front wall subassemblies 131, and back wall 127 may be formed of aluminum structural insulated panels. In some embodiments, deployable mobile module 100 may be fire rated and may be weatherproof.

In some embodiments, deployable mobile module 100 may be configured to withstand, for example and without limitation, 152 mph winds when in the transport position and 80 mph winds when in the deployed configuration. Deployable mobile module 100 may be configured to withstand seismic load and temperature extremes.

In some embodiments, deployable mobile module 100 may include an integrated electrical system that may include, for example, an electrical service sub-panel and one or more receptacles, which may include ground fault interruption capability. In some embodiments, an uninterruptable power supply with energy storage may be supplied with deployable mobile module 100. In some embodiments, one or more components of deployable mobile module 100 may include one or more additional systems including, for example and without limitation, ducts, and cable chases for routing of components, water, oxygen, gas, wastewater, and network wiring.

In some embodiments, deployable mobile module 100 may be configured with interior UV lights for disinfecting. In some embodiments, deployable mobile module 100 may be configured with floor drain or floor plug 128 positioned in floor panel 107 or outer housing 103. In some embodiments, such a drain or drain plug may be plumbed to a wastewater connection or may be coupled to the exterior of deployable mobile module 100. In some such embodiments, floor drain or floor plugs 128 may be configured such that the interior is cleanable by spray-down cleaning and common cleaning supplies such as bleach solutions or commercial sanitizing cleaners. In some embodiments, the spray hose may be coupleable to a sink positioned in deployable mobile module 100.

In some embodiments, deployable mobile module 100 may be provided with a generator. In some embodiments, external supply lockers, structural hangers, and dollies may be configured to be coupleable to deployable mobile module 100.

In some embodiments, deployable mobile module 100 may be provided with, for example and without limitation, television or display systems 147. In some embodiments, deployable mobile module 100 may include communications systems such as cellular or satellite communications systems, which may provide a hot spot system for users. In some embodiments, sensor systems including, for example and without limitation, GPS, tamper, circuit parity testing, temperature, humidity, water level, and communications monitoring systems may be included with deployable mobile module 100.

Figure 10:
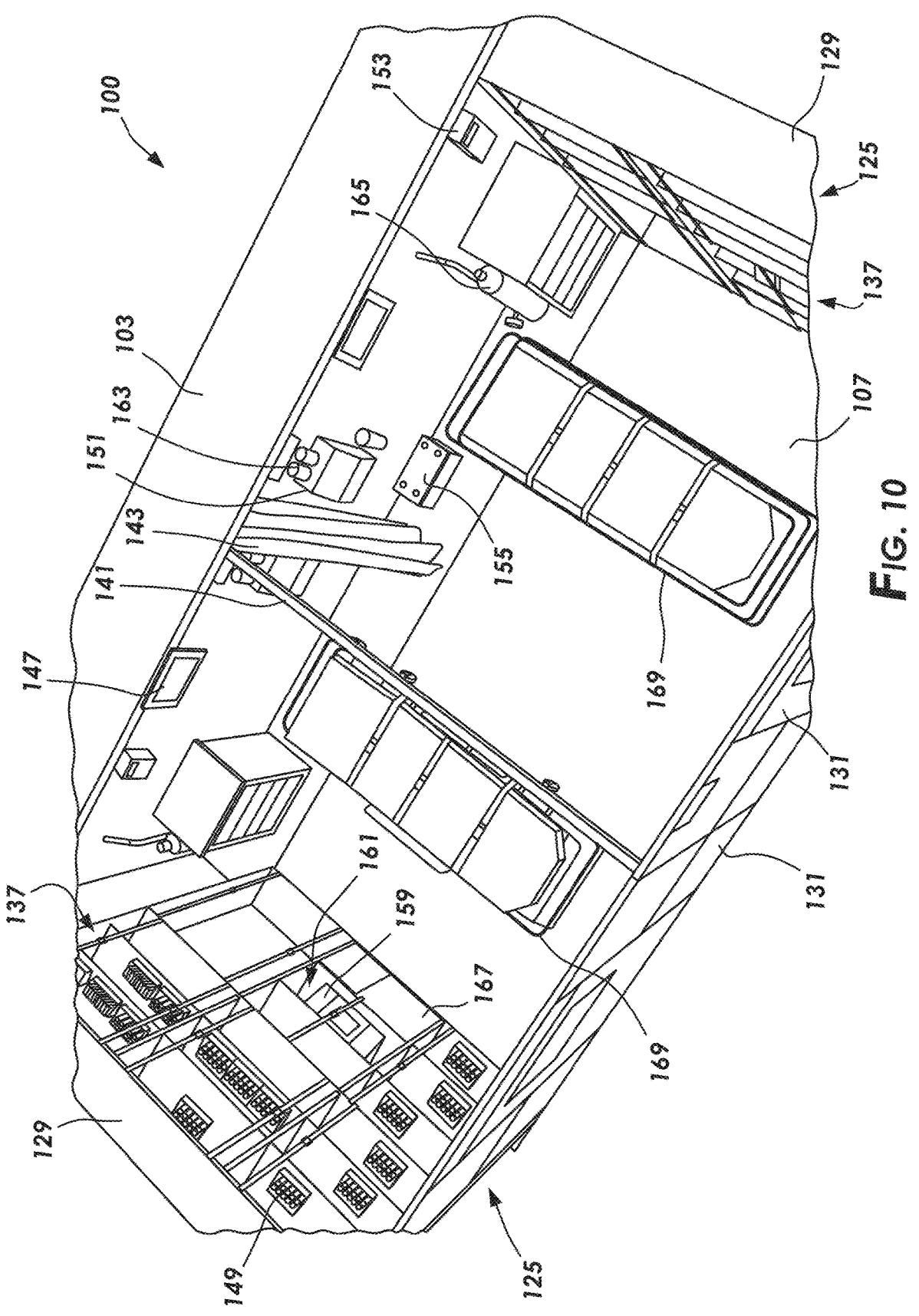

For example and without limitation, FIG. 9 shows an embodiment of a deployable mobile module 100 configured as a medical facility such as, for example and without limitation, a surgical/triage unit, clinic, field veterinary unit, or isolation unit. In such an embodiment, medical equipment may be supplies already installed to and in an operational configuration such as, for example and without limitation, medicines 149, patient monitoring 147, ventilators 151, diagnostic machines 153, ice chests 155, wall clocks 157 (shown in FIG. 7), defibrillators 159, crash carts 161, folding stools, intravenous hangers, vacuum systems 163, oxygen supplies 165, storage shelves 137, wall triage bags, medication lock box 167, and other medical supplies. In some embodiments, one or more portable hospital beds or gurneys 169 may be transported with deployable mobile module 100 in a folded position along back wall 127 such that they can be folded down for use as shown in FIG. 10. In some embodiments, deployable mobile module 100 may be provided with a UVC 222n Pathogen Neutralizing Fixture.

When configured as a medical facility, deployable mobile module 100 may provide a robust, quick-deployable, fixed or transportable, over the horizon, medical operations, command and control, and housing module. In some embodiments, multiple deployable mobile modules 100 may be used at a single location to provide or extend capability for one or more of intake, recovery, surgery, dormitory, isolation, evac, operations continuity or field preparedness/provisioning.

Figure 11:
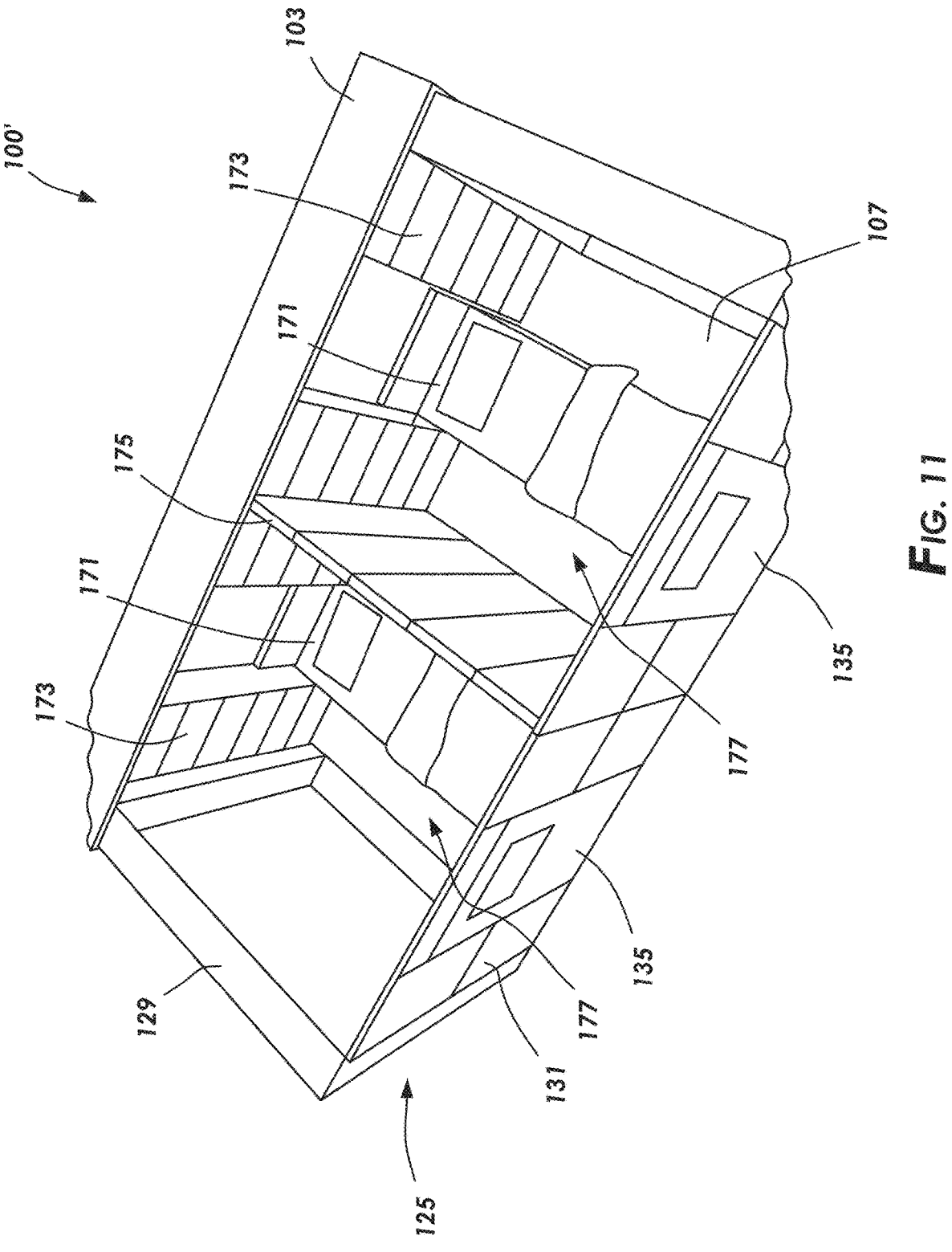
FIG. 11 depicts a partially transparent perspective view of a deployable mobile module in a deployed configuration consistent with at least one embodiment of the present disclosure.
Figure 12:
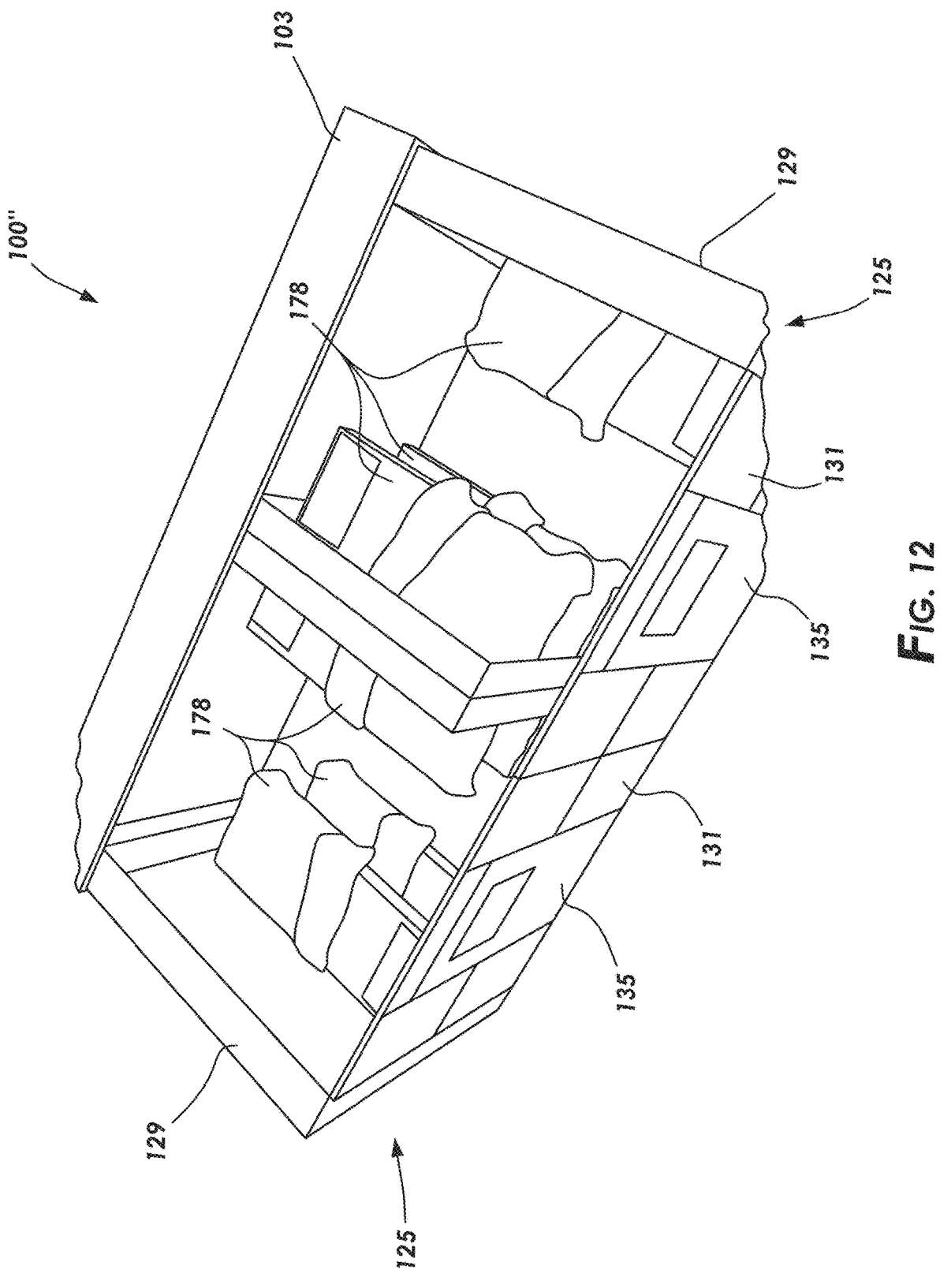
FIG. 12 depicts a partially transparent perspective view of a deployable mobile module in a deployed configuration consistent with at least one embodiment of the present disclosure.

As another nonlimiting example of an embodiment of deployable mobile module 100', FIG. 11 shows a dormitory configuration that includes beds 171 and storage spaces 173. In such an embodiment, deployable partition 175 may be operated to separate the interior of deployable mobile module 100 into two separate rooms 177. FIG. 12 shows an alternative dormitory configuration of deployable mobile module 100" consistent with at least one embodiment of the present disclosure that includes multiple bunks 178 to provide dormitory space for multiple people, such as the 8-bunk configuration as shown. In some such embodiments, escape windows may be provided.

Figure 13:
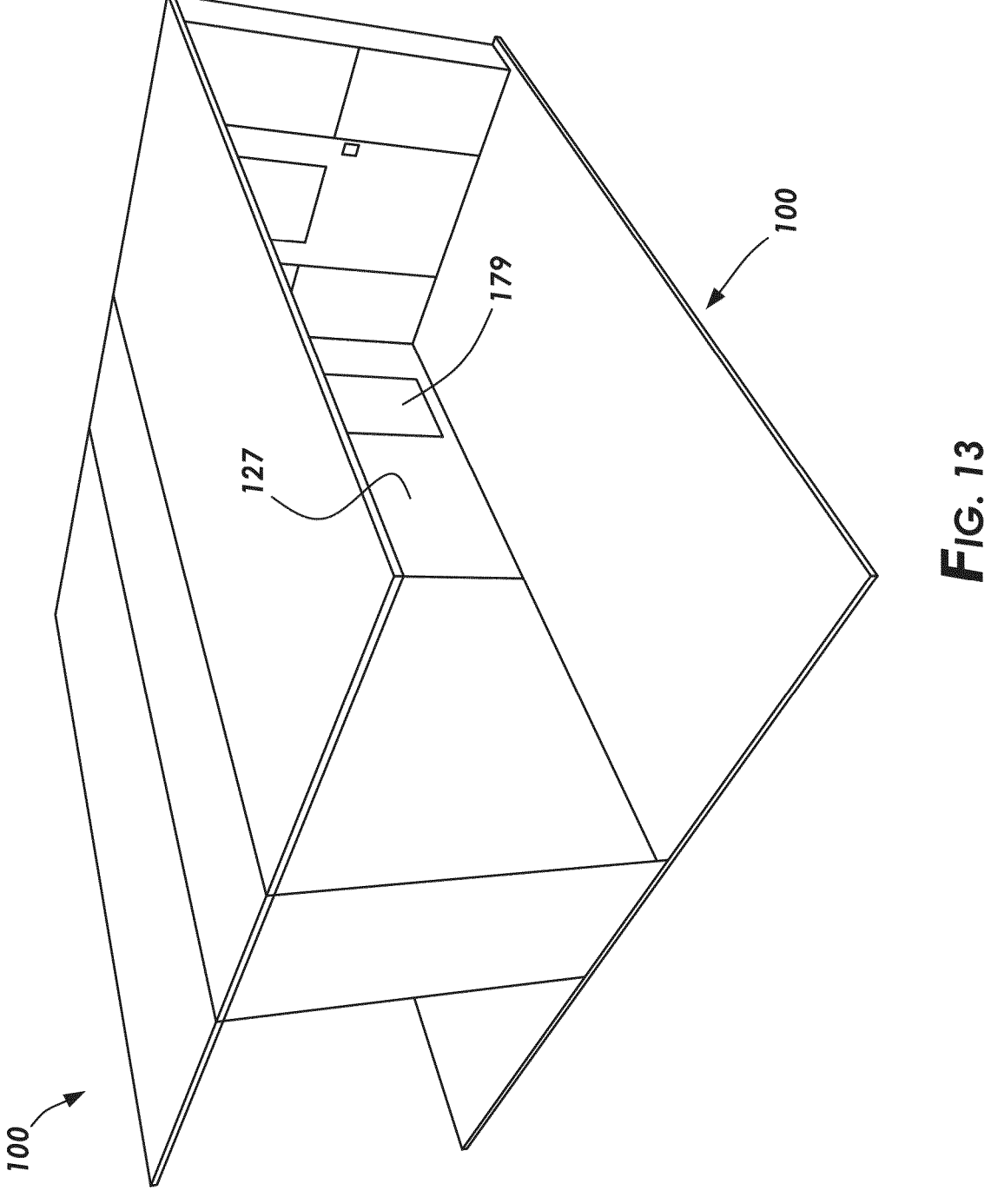
FIG. 13 depicts an alternate configuration of a deployable mobile module consistent with at least one embodiment of the present disclosure.

In some embodiments, as discussed above, deployable mobile module 100 may be freestanding, trailer mounted, or may be secured to a wall. In other embodiments, as shown in FIG. 13, two deployable mobile modules 100, shown in a partially-transparent view, may be deployed back to back. In other embodiments, multiple deployable mobile modules 100 may be similarly deployed in a line. In some such embodiments, one or more doors 179 may be formed in each back wall 127 or in sidewall assemblies 125 to allow direct access between adjacent deployable mobile modules 100. In some embodiments, deployable mobile modules 100 may include openings in back walls 127 such that passageways are formed between the deployable mobile modules 100 when in the back-to-back configuration.

In some nonlimiting embodiments, the following specifications and features may apply to a deployable mobile module 100 consistent with at least one embodiment of the present disclosure.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:

transporting a deployable mobile module by manpower using a handcart or dolly to a location while folded with an external width dimension that enables simultaneous handling opposing sides of the deployable mobile module by a person, the deployable mobile module including:

an outer housing and components that are each formed from layered composites of foam and polymers, wherein the components include:

a roof panel, the roof panel pivotably coupled to an upper edge of the outer housing;

a floor panel, the floor panel pivotably coupled to a lower edge of the outer housing;

a first sidewall assembly, the first sidewall assembly pivotably coupled to a first side edge of the outer housing, the first sidewall assembly including a first sidewall housing and a first front wall subassembly, the first front wall subassembly pivotably coupled to a front edge of the first sidewall housing; and a second sidewall assembly, the second sidewall assembly pivotably coupled to a second side edge of the outer housing, the second sidewall assembly including a second sidewall housing and a second front wall subassembly, the second front wall subassembly pivotably coupled to a front edge of the second sidewall housing;

unfolding the roof panel by pivoting the roof panel upward relative to the outer housing to a substantially horizontal position;

unfolding the floor panel by pivoting the floor panel downward relative to the outer housing to a substantially horizontal position;

unfolding the first sidewall assembly to a position substantially perpendicular to the outer housing;

unfolding the second sidewall assembly to a position substantially perpendicular to the outer housing;

unfolding the first front wall subassembly to a position substantially perpendicular to the first sidewall housing; and unfolding the second front wall subassembly to a position substantially perpendicular to the second sidewall housing and abutting the first front wall subassembly such that the outer housing, roof panel, floor panel, first sidewall housing, first front wall subassembly, second sidewall housing, and second front wall subassembly form an enclosed space.

2. The method of claim 1, wherein the deployable mobile module further comprises a floor actuator coupled between the outer housing and the floor panel or a roof actuator coupled between the outer housing and the roof panel, wherein the unfolding the floor operation or the unfolding the roof operation comprises extending the floor actuator or roof actuator to unfold the floor panel or roof panel.

3. The method of claim 1, wherein the deployable mobile module further comprises a lock, and wherein the lock is unlocked before the unfolding operations.

4. The method of claim 1, further comprising coupling the deployable mobile module to an external power source.

5. The method of claim 1, wherein the transporting operation comprises transporting the deployable mobile module by handcart.

6. The method of claim 1, further comprising attaching a floor spreader to the outer housing at a receptacle of the outer housing.

7. The method of claim 1, wherein at least one pivotable coupling comprises a piano hinge with an integrated waterproof gasket.

8. The method of claim 1, wherein the front wall subassembly comprises a door.

9. The method of claim 1, further comprising supporting the roof panel with the sidewall assembly and supporting the sidewall assembly with the floor panel.

10. A deployable mobile module comprising:

an outer housing;

components that are each formed from layered composites of foam and polymers and are foldable such that the deployable mobile module is transportable by manpower using a handcart or dolly while folded with an external width dimension that enables simultaneous handling opposing sides of the deployable mobile module by a person, wherein the components include:

a roof panel, the roof panel pivotably coupled to an upper edge of the outer housing;

a floor panel, the floor panel pivotably coupled to a lower edge of the outer housing; and a sidewall assembly, the sidewall assembly pivotably coupled to a side edge of the outer housing, the sidewall assembly including a sidewall housing and a front wall subassembly, the front wall subassembly pivotably coupled to a front edge of the sidewall housing.

11. The deployable mobile module of claim 10, further comprising a floor actuator coupled between the outer housing and the floor panel or a roof actuator coupled between the outer housing and the roof panel.

12. The deployable mobile module of claim 10, further comprising a lock positioned to retain the roof panel and floor panel in the folded configuration.

13. The deployable mobile module of claim 10, further comprising a power connection positioned at an end of the outer housing.

14. The deployable mobile module of claim 10, wherein the outer housing comprises a receptacle adapted to couple to a floor spreader, the floor spreader in contact with the ground to support the deployable mobile module.

15. The deployable mobile module of claim 10, wherein at least one pivotable coupling comprises a piano hinge with an integrated waterproof gasket.

16. The deployable mobile module of claim 10, wherein the front wall subassembly comprises a door.

17. The deployable mobile module of claim 10, further comprising a second sidewall assembly, the second sidewall assembly pivotably coupled to a second side edge of the outer housing, the second sidewall assembly including a second sidewall housing and a second front wall subassembly, the second front wall subassembly pivotably coupled to a front edge of the second sidewall housing.

18. The deployable mobile module of claim 17, wherein the outer housing, floor panel, roof panel, first sidewall assembly, and second sidewall assembly are movable between a transport configuration and a deployed configuration.

19. The deployable mobile module of claim 18, wherein, when in the transport configuration, the sidewall assemblies of the deployable mobile module are enclosed within the outer housing and a front panel, the front panel defined by the floor panel or the roof panel.

20. The deployable mobile module of claim 18, wherein, when in the deployed configuration, the floor panel and roof panel are substantially horizontal, the sidewall housings are substantially perpendicular to the outer housing, and the front wall subassemblies are substantially parallel to the outer housing, such that the outer housing, floor panel, roof panel, sidewall housings, and front wall subassemblies define an enclosed space therewithin.

21. The deployable mobile module of claim 20, wherein the roof panel is supported on the sidewall assemblies and outer housing.

22. The deployable mobile module of claim 10, wherein the roof panel further comprises a partition rail, the partition rail coupling to a partition and allowing the deployment of the partition to separate the interior of the deployable mobile module into two rooms when in a deployed position.

23. The deployable mobile module of claim 10, wherein the front wall subassembly comprises an exterior light.

24. The deployable mobile module of claim 10, wherein the floor panel further comprises a floor drain or floor plug formed in the floor panel or outer housing.

25. The deployable mobile module of claim 10, further comprising one or more pieces of equipment coupled to one or more of the sidewall assemblies or outer housing such that the equipment remains within the deployable mobile module in both the transport configuration and the deployed configuration.

26. The deployable mobile module of claim 25, wherein the one or more pieces of equipment comprise one or more of ventilators, diagnostic machines, ice chests, wall clocks, defibrillators, crash carts, vacuum systems, oxygen supplies, storage shelves, medication lock boxes, and medications positioned therein.

27. The deployable mobile module of claim 25, wherein the one or more pieces of equipment comprise one or more hospital beds or gurneys pivotably coupled to the outer housing such that the hospital beds or gurneys are transported with the deployable mobile module in the transport configuration and are foldable down into a usable position when deployed.

28. The deployable mobile module of claim 25, wherein the one or more pieces of equipment comprise one or more beds.

\* \* \* \* \*